(12) United States Patent
Liebig

(10) Patent No.: US 7,260,938 B2
(45) Date of Patent: Aug. 28, 2007

(54) METHOD AND ARRANGEMENT FOR ADAPTING A PARAMETER OF A HOT GAS OF A HOT-GAS GENERATOR HAVING A DOWNSTREAM TECHNOLOGICAL PROCESS

(75) Inventor: Erhard Liebig, Laufenburg (DE)

(73) Assignee: Alstom Technology, Ltd., Baden (CH)

( * ) Notice: Subject to any disclaimer, the term of this patent is extended or adjusted under 35 U.S.C. 154(b) by 349 days.

(21) Appl. No.: 10/811,092

(22) Filed: Mar. 26, 2004

(65) Prior Publication Data

US 2004/0209207 A1   Oct. 21, 2004

(30) Foreign Application Priority Data

Mar. 28, 2003   (DE) ................. 103 14 041

(51) Int. Cl.
*F02C 6/04* (2006.01)
(52) U.S. Cl. .......................... 60/783; 60/39.5
(58) Field of Classification Search ............ 60/39.5, 60/39.52, 39.511, 783, 772, 784; 431/2
See application file for complete search history.

(56) References Cited

U.S. PATENT DOCUMENTS 5,794,431 A * 8/1998 Utamura et al. .............. 60/783

6,298,655 B1   10/2001 Lee et al. ................. 60/39.182
2005/0150229 A1 * 7/2005 Baer et al. .................... 60/772

FOREIGN PATENT DOCUMENTS

| DE | 4319936 | 12/1994 |
|---|---|---|
| DE | 19734862 | 2/1999 |
| DE | 19845763 | 12/1999 |
| DE | 19961540 | 12/2000 |
| DE | 10109336 | 9/2002 |
| EP | 0967366 | 12/1999 |
| EP | 1050667 | 11/2000 |
| WO | 9429642 | 12/1994 |

* cited by examiner

*Primary Examiner*—William H. Rodriguez
(74) *Attorney, Agent, or Firm*—Darby & Darby

(57) ABSTRACT

A method for adapting a parameter of a hot gas of a hot-gas generator having a downstream technological process. The method includes emitting a mass flow of the hot gas from the hot-gas generator into a connecting element, discharging a first portion of the mass flow from the connecting element using an exhaust, feeding a second portion of the mass flow to the technological process using the connecting element, and influencing a temperature of the hot gas between the hot-gas generator and the technological process. In addition, an arrangement for adapting a parameter of a hot gas.

20 Claims, 2 Drawing Sheets

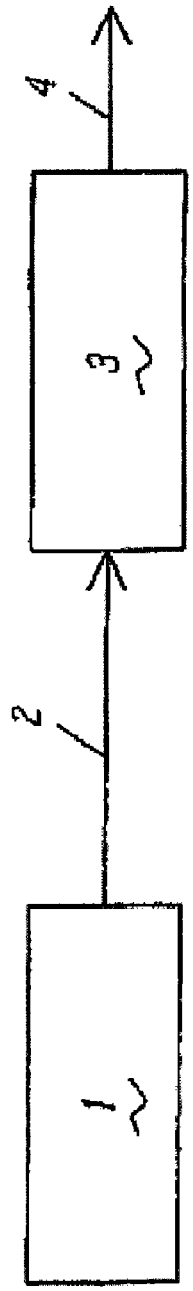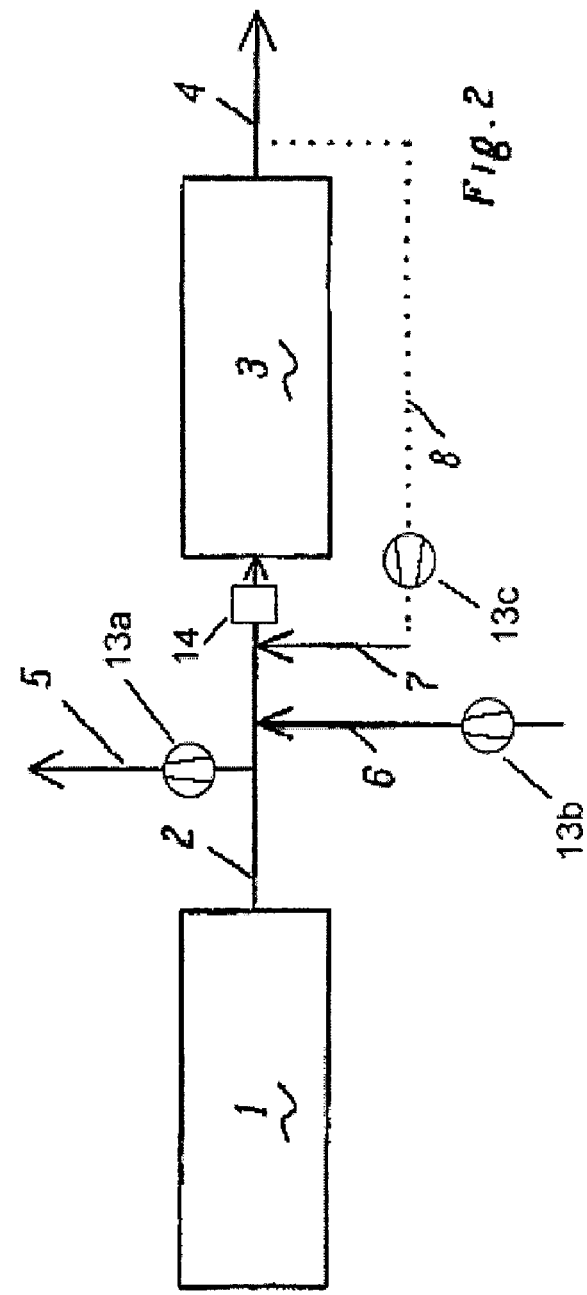

METHOD AND ARRANGEMENT FOR ADAPTING A PARAMETER OF A HOT GAS OF A HOT-GAS GENERATOR HAVING A DOWNSTREAM TECHNOLOGICAL PROCESS

Priority is claimed to German Patent Application No. DE 103 14 041.7, filed on Mar. 28, 2003, the entire disclosure of which is incorporated by reference herein.

The present invention relates to a method for adapting a parameter of a hot gas of a hot-gas generator having a downstream technological process. In this case, the hot-gas mass flow delivered by the hot-gas generator is fed to the technological process via a connecting element. The present invention also relates to an arrangement for carrying out such a method and to the use of such a method in connection with upgrades of gas turbine plants.

BACKGROUND

The realization of output-increasing or efficiency-increasing conversions on hot-gas generators, such as a gas turbine plant for example, generally entails changes in the parameters of the hot gas. Such "upgrades", but also fuel changes, etc., typically lead to a change in the parameters of the hot gas. This is significant for the downstream constructions, in particular in the case of a downstream technological process for the material and/or thermal utilization of the hot gas, for example in the case of a heat-recovery boiler for utilizing the waste heat.

The thermal process of, for example, a heat-recovery boiler depends to a great extent on the gas-side temperature conditions and flow conditions. Adaptation of the heat-recovery boiler to the changed conditions is very difficult. In addition, the design conditions may be exceeded at an increased gas temperature.

In order not to influence the technological processes downstream of a gas turbine plant in the event of an upgrade, attempts are made by means of suitable measures to keep the parameters of the gas constant, or to limit them, in accordance with the design conditions of the heat-recovery boiler.

In principle, the gas-side temperatures and also mass flows can be increased or reduced individually or in combination by conversion measures on gas turbine plants.

The output of a gas turbine plant essentially depends on the mass flow, and the efficiency essentially depends on the process temperature. For the aforesaid reasons, it is attempted to increase these parameters individually or in combination, which entails higher mass flows and temperatures of the hot gas.

In the prior art, by way of example for gas turbine plants, measures for adapting the parameters of the hot gas have been proposed for the situation of both too high a gas temperature and too low a gas temperature.

Thus, for example, DE 198 45 763 A1 describes measures for the situation of too high a gas temperature. To lower the temperature of the exhaust gases, a coolant (in the specific case air or steam) is admixed with the exhaust gases between gas turbine and exhaust-gas system. Attempts to cool the exhaust gases by means of water injection are also known. In addition, in this connection, a special air-inlet passage is described in DE 199 61 540 A1.

For the opposite situation of too low a gas temperature, in particular auxiliary combustion systems are proposed. To increase the temperature of the exhaust gases, auxiliary combustion systems, for the most diverse reasons, are known in the most diverse embodiments with and without blowers. The blowers serve in this case, inter alia, to increase the gas mass flow, for example in order to ensure a sufficient oxygen feed or to guarantee an operation at part load or during stoppage of the gas turbine plant. In this connection, for example, the following applications maybe cited: EP 1 050 667 A1; DE 101 09 336 A1; DE 199 61 540 A1; DE 43 19 936 A1; EP 0 967 366 A1; DE 197 34 862 A1.

SUMMARY OF THE INVENTION

An object of the present invention is to provide a further way of being able to react to a conversion of the hot-gas generator without considerable design changes to the entire plant. The present invention provides a method for adapting the parameters of the hot gas of a hot-gas generator having a downstream technological process, the hot-gas mass flow delivered by the hot-gas generator being fed to the technological process via a connecting element.

Before the hot gas is directed into the technological process, some of the hot-gas mass flow is discharged via an exhaust, and at the same time the temperature of the hot gas between hot-gas generator and technological process is influenced.

It has been found that, in the case of such conversions or upgrades, it is not only the temperature of the hot gases downstream of the hot-gas generator that is changed, but often the mass flow is also changed at the same time. By conversion measures, for example on gas turbine plants, both the temperature and the mass flow can be increased or reduced on the gas-side individually or in combination. At any rate, even if the mass flow stays the same, the adaptation of the hot-gas mass flow delivered to the technological process by the hot-gas generator can be realized by influencing the mass flow while simultaneously influencing the temperature of the hot gases between hot-gas generator and technological process.

If, for example, the mass flow is constant directly downstream of the hot-gas generator, but the temperature is too high, adaptation to the technological process can be achieved by partially drawing off hot gas via an exhaust arranged in the region of the connecting element between hot-gas generator and technological process, while at the same time influencing the temperature of the hot gases between hot-gas generator and technological process. Equally, in the case of too high a mass flow and too high a temperature directly downstream of the hot-gas generator, adaptation to the technological process can be effected by partly drawing off hot gas via an exhaust in the region of the connecting element between hot-gas generator and technological process, while simultaneously influencing the temperature of the hot gases between hot-gas generator and technological process.

In this connection, it must be pointed out that the "exhaust" proposed within the scope of this invention is not to be equated with a bypass. A bypass, as already known in the prior art, serves in specific operating cases (start-up of a plant, shutdown of a plant, malfunction situations) to avoid the technological process downstream of the hot-gas generator. Accordingly, a bypass is designed for the maximum possible hot-gas mass flow and can be switched on or off in the sense of an on/off switch.

In contrast thereto, the exhaust proposed within the scope of the invention is distinguished by the fact that the hot-gas mass flow is regulated downstream of the hot-gas generator, and accordingly only a regulated portion of the hot gases is drawn off through the exhaust. Such an exhaust is therefore designed in accordance with the conditions changed by the conversion or the upgrade, or for optimizing the operating conditions of the downstream technological process. Such an exhaust therefore does not serve to bridge the downstream technological process but simply just to regulate the hot-gas mass flow for adaptation to this technological process.

According to a first preferred embodiment, in particular if the temperature of the hot gases is too high, coolants and/or additives can be fed to the hot-gas mass flow in particular in the region of the connecting element. Thus the range of the possible operating modes can be further increased, and the efficiency of the entire process can possibly be improved. Suitable coolants are, for example, gases, such as air for example. However, it is also possible to use vapors, such as steam for example, and/or liquids, such as water for example, and/or exhaust gas which is recirculated downstream by the technological process for influencing or cooling the hot gas downstream of the hot-gas generator. Suitable additives are in particular additives for the reduction of emissions (especially for the reduction of NOx), such as, for example, ammonia, urea or exhaust gas.

If the change in the conditions at the hot-gas generator leads to an increased mass flow with at the same time a reduction in the temperature, it may prove to be advisable to additionally heat the mass flow downstream of the hot-gas generator. This heating may advantageously be effected with the aid of auxiliary combustion. In this case, the auxiliary combustion may be auxiliary combustion with a forced-draft fan or auxiliary combustion in the form of a channel burner. Such auxiliary combustion may either be arranged between hot-gas generator and technological process in or on the connecting element, but it is also possible to provide auxiliary combustion in the inlet region of the technological process.

In principle, the proportion of the hot-gas mass flow drawn off via the exhaust may be firmly set. However, according to a further preferred embodiment, the partial drawing-off of hot gas from the connecting element between hot-gas generator and technological process is regulated. In this case, the regulation may be effected as a function of different parameters, thus, for example, as a function of the mass flow determined upstream of the exhaust, and/or of the temperature determined there, and/or of the flow velocity determined there, and/or of the pressure determined there. Such regulation increases the flexibility and also allows the efficiency to be kept as high as possible even under different operating conditions.

According to a further development of this embodiment, the regulation may be effected with the aid of adjusting devices, such as flaps for example, and/or delivery devices, such as blowers for example. The adjusting devices and delivery devices serve in particular to discharge the hot gases in a controlled manner from the connecting element between hot-gas generator and technological process.

According to another preferred embodiment, the hot-gas generator is preferably a combustion plant, in particular a gas turbine plant. The technological process is preferably a hot-water generator or a steam generator, in particular a heat-recovery boiler.

Further preferred embodiments of the method according to the invention are described in the claims.

The present invention also relates to an arrangement for carrying out a method as described above. The arrangement is characterized in that the exhaust is provided with a regulator configured to reduce the hot-gas mass flow.

It is advantageous if the regulator can be activated as a function of the mass flow determined upstream of the exhaust, and/or of the temperature determined there, and/or of the flow velocity determined there.

BRIEF DESCRIPTION OF THE DRAWINGS

The invention is explained in more detail below with reference to exemplary embodiments in connection with the drawings, in which:

FIG. 1 shows a schematic representation of a hot-gas generator with downstream technological process (prior art);

FIG. 2 shows a schematic representation according to FIG. 1 with exhaust; and

DETAILED DESCRIPTION

Figure 3:
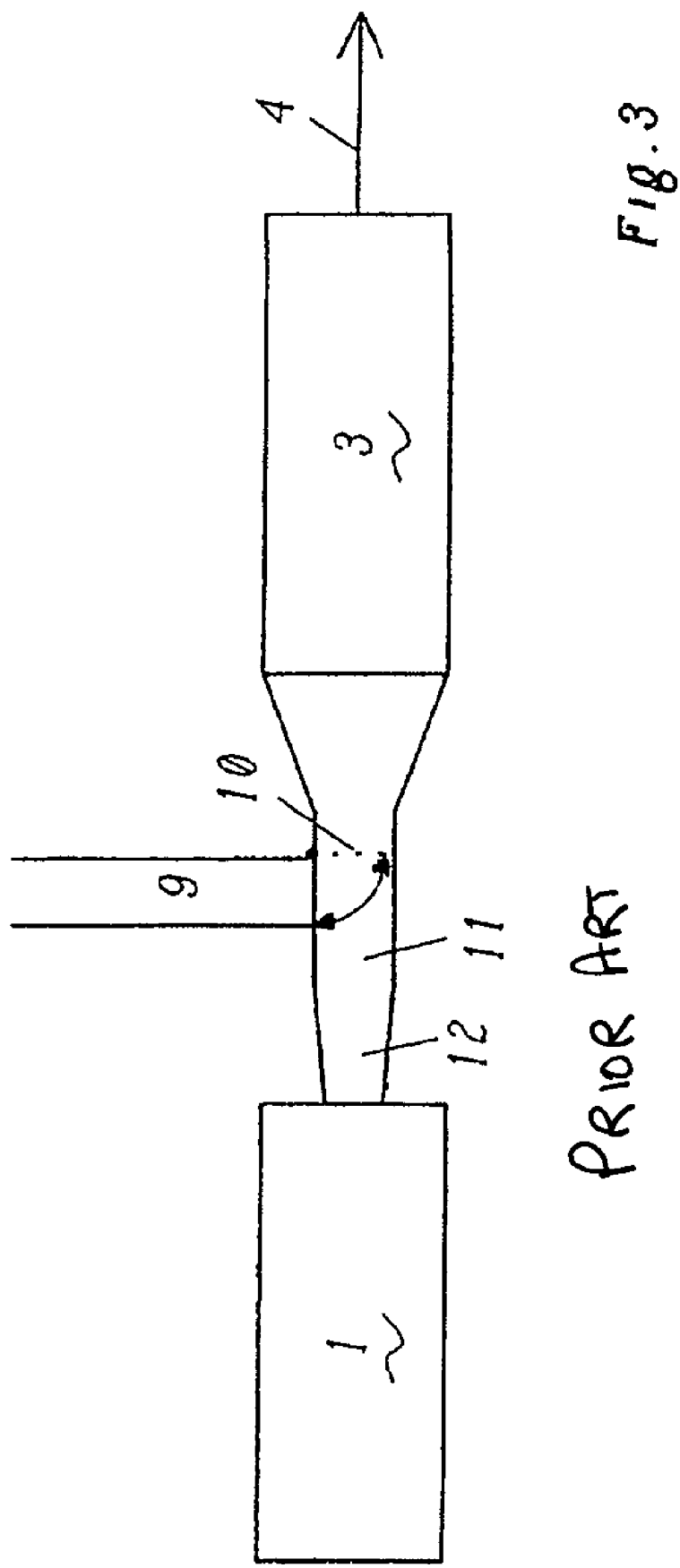
FIG. 3 shows a schematic representation of a corresponding plant with bypass (prior art).

By simple technical measures, in addition to the prior art, the gas-side design conditions of downstream processes can be ensured, in particular at an excessively high hot-gas mass flow and an excessively high hot-gas temperature of the hot-gas generator.

FIG. 1, in a schematic representation, shows a plant which is suitable for the proposed method. The plant comprises a hot-gas generator 1. The hot-gas generator 1 may be any desired combustion plant irrespective of the fuel and the design. In particular, it may be a gas turbine plant, the invention being independent of the design, the number of compressors, combustion chambers and turbines, the drive function (generator, pumps, compressors) etc. The hot gases of this hot-gas generator 1 are transferred via a connecting element 2 to a technological process 3. In this case, the connecting element 2 may comprise different elements, such as diffusers for example. The technological process 3 may be any desired technological process, such as, for example, a smelting process, a drying process, etc. Also suitable are hot-water generators or steam generators, in particular heat-recovery boilers, or else even conventionally fired steam generators (a gas turbine plant as a forced-draft fan). In the case of a heat-recovery boiler 3, the present invention is independent of the number of pressure stages, reheating, the design, etc. Downstream of the technological process 3, the exhaust gas 4 is discharged into the environment.

In such an apparatus, the following situations are now involved:

a) Mass Flow Constant:

Temperature too high: In this situation, the mass flow in the connecting element 2 is reduced via an exhaust 5, as shown in FIG. 2. At the same time, coolant is supplied, as shown in FIG. 2 by reference numeral 6.

b) Mass Flow Too High:

Temperature too low: In this situation, the mass flow is likewise reduced via an exhaust 5. At the same time, the hot-gas temperature of the hot-gas generator is increased via auxiliary combustion.

Temperature too high: In this situation, the mass flow is likewise reduced via an exhaust 5 and at the same time coolant is supplied as already described above in the case of constant mass flow.

In addition to the coolant 6, an additive 7 for the reduction of emissions may also be fed. In addition, as indicated in FIG. 2 by the reference numeral 8, (exhaust-)gas recirculation may be realized.

Suitable arrangements are provided for the feeding of the coolant and additive. These arrangements, in addition to the corresponding lines and control elements, may also comprise pumps, blowers, such as blowers 13b and 13c shown in FIG. 2, spraying and distribution systems and the like. If there is a vacuum in the connecting element 2, the coolant or additive can also be drawn in automatically. The additive used for the reduction of emissions may be, for example in the case of auxiliary combustion in the heat-recovery boiler for NOx reduction, ammonia ($NH_3$), urea ($CO(NH_2)_2$), or exhaust gas (exhaust-gas recirculation).

Suitable arrangements are provided for the discharge of hot gas via an exhaust 5. These arrangements, in addition to an exhaust, may comprise adjusting devices, such as flaps for example, delivery devices such as blowers, for example blower 13a shown in FIG. 2, controls and the like. If there is a positive pressure in the connection 2, blowers and the like may possibly be dispensed with.

The auxiliary combustion, depending on the oxygen content of the hot gases, is effected with burners, such as burner 14 shown in FIG. 2, with fresh-air operation or with pure channel burners (e.g. downstream of gas turbine plants without a forced-draft fan=utilization of the oxygen content in the hot gas).

The invention has the following advantages:

First of all, there are no reasons for preventing possible conversions of the hot-gas generator nor are there any restrictions on these conversions (e.g. upgrade of a gas turbine plant). The proposed measures (exhaust in combination with cooling or heating) can be retrofitted on existing plants without a greater outlay or can be taken into account in the case of conversions. Furthermore, the conversion (e.g. the upgrade) can be made without influencing technological processes downstream on the hot-gas side. More extensive modifications to the technological process downstream on the hot-gas side are therefore likewise avoided.

In the case of conversions of hot-gas generators, in particular for increasing output and efficiency, the parameter changes with regard to temperature and mass flow fluctuate within the range of +/−10%.

In the case of upgrades of gas turbine plants, the change in the parameters depends on the actual measures. Compressor and turbine upgrades, and a combination of both measures, are essentially distinguished. In this case, the parameter changes with regard to temperature fluctuate within the range of −20 K to +40 K and the mass flow fluctuates within the range of +6% to +8%, exceptionally up to +12%.

Taking into account existing design margins, the exhaust for discharging some of the mass flow, the feed of coolant and the auxiliary combustion are to be designed in accordance with these changes in the parameters.

The exhaust 5 for discharging some of the hot-gas mass flow is preferably to be arranged at a location where as high a pressure as possible prevails in the connecting element 2. In this way, the hot gas can possibly be discharged without additional delivery devices.

On the other hand, the feed of the coolant and of the additive is preferably to be arranged at a location where as high a vacuum as possible prevails in the connecting element 2. In this way, the coolant and the additive can possibly be fed without additional delivery devices.

To illustrate a bypass, from which the present invention with an exhaust is differentiated, a typical plant according to the prior art having a bypass is shown in FIG. 3. Here, there is a gas turbine plant 1, downstream of which is a diffuser 12 and then a duct 11. A bypass 9 is now simply arranged on this duct 11 and can be switched on or off with a device, for example a flap 10. The bypass 9 is designed in such a way that the entire hot-gas mass flow is discharged via this bypass 9 when the flap 10 is opened to the bypass 9. The bypass 9 serves to avoid and thus protect the technological process 3 during transient processes (e.g. start-up and shut-down) and in malfunction situations. In addition to the on/off position, it is in principle possible to actuate an intermediate position with the flap 10. However, there is no possibility of regulating the hot-gas mass flow for the heat-recovery boiler by means of the device 10.

What is claimed is:

1. A method for adapting a parameter of a hot gas of a hot-gas generator having a downstream technological process, the method comprising:

emitting a mass flow of the hot gas from the hot-gas generator into a connecting element;

discharging a first porion of the mass flow from the connecting element using an exhaust;

feeding a second portion of the mass flow to the technological process using the connecting element; and influencing a temperature of the hot gas between the hot-gas generator and the technological process, wherein the influencing of the temperature includes feeding at least one of a coolant and an additive to the hot gas in a region of the connecting element, and wherein the feeding is performed at a first location of the connecting clement having a lowest pressure in the connecting element, and wherein the discharge is performed at a second location of the connecting element having a highest pressure in the connecting element.

2. The method as recited in claim 1, wherein the influencing includes heating hot gas downstream of the hot-gas generator.

3. The method as recited in claim 1, further comprising regulating a proportion of the first portion of the hot-gas mass flow.

4. The method as recited in claim 3, wherein the regulation is performed using at least one an adjusting device and a delivery device.

5. The method as recited in claim 1, wherein the parameter includes at least one of a temperature, a pressure and a mass flow of the hot gas.

6. A method for adapting a parameter of a hot gas of a hot-gas generator having a downstream technological process, the method comprising:

emitting a mass flow of the hot gas from the hot-gas generator into a connecting element;

discharging a first portion of the mass flow from the connecting element using an exhaust;

feeding a second portion of the mass flow to the technological process using the connecting element; and influencing a temperature of the hot gas between the hot-gas generator and the technological process, wherein the influencing of the temperature includes feeding at least one of a coolant and an additive to the hot gas in a region of the connecting element, and wherein the coolant includes at least one of a gas, a vapor, a liquid.

7. The method as recited in claim 6, wherein the gas is an exhaust gas recirculated from a location downstream of the technological process.

8. The method as recited in claim 7, wherein the gas is air, the vapour is steam and the liquid is water.

9. A method for adapting a parameter of a hot gas of a hot-gas generator having a downstream technological process, the method comprising:

emitting a mass flow of the hot gas from the hot-gas generator into a connecting element;

discharging a first portion of the mass flow from the connecting element using an exhaust;

feeding a second portion of the mass flow to the technological process using the connecting element; and influencing a temperature of the hot gas between the hot-gas generator and the technological process, wherein the influencing of the temperature includes feeding at least one of a coolant and an additive to the hot gas in a region of the connecting element, and wherein the additive is configured to provide a reduction of emissions.

10. The method as recited in claim 9, wherein the additive includes at least one of ammonia, urea and an exhaust gas.

11. A method for adapting a parameter of a hot gas of a hot-gas generator having a downstream technological process, the method comprising:

emitting a mass flow of the hot from the hot-gas generator into a connecting element;

discharging a first portion of the mass flow from the connecting element using an exhaust;

feeding a second portion of the mass flow to the technological process using the connecting element; and influencing a temperature of the hot gas between the hot-gas generator and the technological process, wherein the influencing of the temperature includes feeding at least one of a coolant and an additive to the hot gas in a region of the connecting element, wherein the influencing includes heating hot gas downstream of the hot-gas generator, and wherein the heating includes raising an initial temperature of the hot gas within a range of up to 10%.

12. The method as recited in claim 11, wherein the heating is performed using an auxiliary combustion, and wherein the auxiliary combustion is performed using at least one of a fresh air burner and a channel burner.

13. The method as recited in claim 12, and wherein the auxiliary combustion is performed at at least one of a first location between hot-gas generator and technological process, a second location in the connecting element, a third location on the connecting element, and a fourth location in the inlet region of the technological process.

14. The method as recited in claim 12, wherein the hot-gas generator is a combustion plant and the technological process includes one of a hot-water generator or a steam generator.

15. The method as recited in claim 14, wherein the combustion plant is a gas turbine plant and wherein the technological process includes a heat-recovery boiler.

16. A method for adapting a parameter of a hot gas of a hot-gas generator having a downstream technological process, the method comprising:

emitting a mass flow of the hot gas from the hot-gas generator into a connecting element;

discharging a first portion of the mass flow from the connecting element using an exhaust;

feeding a second portion of the mass flow to the technological process using the connecting element;

influencing a temperature of the hot gas between the hot-gas generator and the technological process; and regulating a portion of the first portion of the hot-gas mass flow, wherein the influencing of the temperature includes feeding at least one of a coolant and an additive to the hot gas in a region of the connecting element, and wherein the regulating is performed as a function of at least one of the mass flow at a first location, a temperature of the mass flow at the first location, a flow velocity of the mass flow at the first location, and a pressure of the mass flow at the first location, wherein the first location is upstream of the exhaust.

17. A method for adapting a parameter of a hot gas of a hot-gas generator having a downstream technological process, the method comprising:

emitting a mass flow of the hot gas from the hot-gas generator into a connecting element;

discharging a first portion of the mass flow from the connecting element using an exhaust;

feeding a second portion of the mass flow to the technological process using the connecting element;

influencing a temperature of the hot gas between the hot-gas generator and the technological process; and regulating a proportion of the first portion of the hot-gas mass flow, wherein the regulation is performed using at least one an adjusting device and a delivery device, wherein the adjusting device includes a flap and the delivery device includes a blower.

18. A method for adapting a parameter of a hot gas of a hot-gas generator having a downstream technological process, the method comprising:

emitting a mass flow of the hot gas from the hot-gas generator into a connecting element;

discharging a first portion of the mass flow from the connecting element using an exhaust;

feeding a second portion of the mass flow to the technological process using the connecting element; and influencing a temperature of the hot gas between the hot-gas generator and the technological process, wherein the influencing of the temperature includes feeding at least one of a coolant and an additive to the hot gas in a region of the connecting element, and wherein the first portion is in a range of up to 15% of the mass flow.

19. A method for adapting a parameter of a hot gas of a hot-gas generator having a downstream technological process, the method comprising:

emitting a mass flow of the hot gas from the hot-gas generator into a connecting element;

discharging a first portion of the mass flow from the connecting element using an exhaust;

feeding a second portion of the mass flow to the technological process using the connecting element; and influencing a temperature of the hot gas between the hot-gas generator and the technological process, wherein the influencing of the temperature includes feeding at least one of a coolant and an additive to the hot gas in a region of the connecting element, and wherein the first portion is within a discharge range of 6-12% of the mass flow, and wherein the influencing of the temperature is performed within a temperature change range of −20 K to +40 K.

20. The method as recited in claim 19, wherein the discharge range is 6-8% and the temperature change range is positive up to 20 K.

* * * * *